(12) United States Patent
Zhang

(10) Patent No.: US 11,531,237 B2
(45) Date of Patent: Dec. 20, 2022

(54) PIXEL ELECTRODE STRUCTURE AND LIQUID CRYSTAL DISPLAY PANEL

(71) Applicant: TCL China Star Optoelectronics Technology Co., Ltd., Shenzhen (CN)

(72) Inventor: Zixiang Zhang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 304 days.

(21) Appl. No.: 16/759,332

(22) PCT Filed: Apr. 3, 2020

(86) PCT No.: PCT/CN2020/083217
§ 371 (c)(1),
(2) Date: Apr. 26, 2020

(87) PCT Pub. No.: WO2021/179377
PCT Pub. Date: Sep. 16, 2021

(65) Prior Publication Data
US 2022/0043312 A1    Feb. 10, 2022

(30) Foreign Application Priority Data
Mar. 13, 2020    (CN) .......................... 202010173477.5

(51) Int. Cl.
*G02F 1/1343* (2006.01)
*G02F 1/1337* (2006.01)
(52) U.S. Cl.
CPC .. *G02F 1/134309* (2013.01); *G02F 1/133707* (2013.01)

(58) Field of Classification Search
CPC ..................... G02F 1/133707; G02F 1/134309
See application file for complete search history.

(56) References Cited

U.S. PATENT DOCUMENTS

| 2006/0146243 A1 | 7/2006 | Nakanishi et al. |
| 2009/0073367 A1 | 3/2009 | Woo |
| 2013/0242239 A1* | 9/2013 | Chang ............... G02F 1/134336 349/123 |
| 2015/0015822 A1 | 1/2015 | Park et al. |
| 2017/0184927 A1 | 6/2017 | Ho et al. |
| 2017/0235195 A1 | 8/2017 | Song et al. |

(Continued)

FOREIGN PATENT DOCUMENTS

| CN | 1828395 | 9/2006 |
| CN | 101689000 | 3/2010 |
| CN | 104280947 | 1/2015 |

(Continued)

*Primary Examiner* — Jessica M Merlin

(57) ABSTRACT

A pixel electrode structure and a liquid crystal display panel are provided. The pixel electrode structure includes a trunk electrode, a control electrode, and a connection electrode. The trunk electrode divides the pixel electrode structure into a first pixel electrode region and a second pixel electrode region. The control electrode is close to the first pixel electrode region and away from the second pixel electrode region, and is connected to a second branch electrode of the second pixel electrode region through the connection electrode. Increasing a transmission distance from the control electrode to the pixel electrode in a display region prevents an occurrence of dark streaks.

14 Claims, 5 Drawing Sheets

(56) References Cited

U.S. PATENT DOCUMENTS

2018/0095335 A1* 4/2018 Woo .................. G02F 1/136227
2021/0356818 A1* 11/2021 Cao .................. G02F 1/133707

FOREIGN PATENT DOCUMENTS

| CN | 106932969 | 7/2017 |
| CN | 109917592 | 6/2019 |
| CN | 110007530 | 7/2019 |

* cited by examiner

PIXEL ELECTRODE STRUCTURE AND LIQUID CRYSTAL DISPLAY PANEL

RELATED APPLICATIONS

This application is a National Phase of PCT Patent Application No. PCT/CN2020/083217 having International filing date of Apr. 3, 2020, which claims the benefit of priority of Chinese Patent Application No. 202010173477.5 filed on Mar. 13, 2020. The contents of the above applications are all incorporated by reference as if fully set forth herein in their entirety.

FIELD AND BACKGROUND OF THE INVENTION

The present application relates to the field of display technologies, and in particular, to a pixel electrode structure and a liquid crystal display panel.

There are multiple display modes in liquid crystal display (LCD) panels, such as vertical alignment (VA) liquid crystal display, twisted nematic (TN) liquid crystal display, etc. The VA display is a vertical alignment display mode which is normally black, and adopts the VA display mode of negative liquid crystals. After liquid crystals are formed into a cell, the liquid crystals are irregularly tilted. In order to improve response times of the liquid crystals in conventional VA mode, a voltage needs to be applied between an upper electrode 1 and a lower electrode 2 first so that the liquid crystals 3 exhibit a certain pretilt angle, as shown in FIG. 1. A conventional pixel electrode design is shown in FIG. 2, and an electrode region A is a voltage input terminal. Assuming that an electric field strength of the electrode region A is 1, an electric field strength of a display region B close to the electrode region A would be 0.8 as it is too close to the electrode region A. A larger electric field strength here will cause the liquid crystals close to the display region B to be affected by an electric field and align, resulting in a pretilt angle. An electric field strength of a display region C is 0.6, and the liquid crystals in the display region C will be affected by the electric field strength here, and another type of pretilt angle will be generated to form a liquid crystal distribution shape as shown in FIG. 3. Therefore, two different liquid crystal orientations will be formed, two types of "sides" of the liquid crystals can be seen from a front, orientations of the liquid crystal are disorderly, and macroscopic appearance is dark streaks. The dark streaks will affect contrast and transmittance of the liquid crystal display panels, lowering quality of the display panels.

Therefore, a problem of dark streaks in conventional liquid crystal display panels needs to be solved.

SUMMARY OF THE INVENTION

The present application provides a pixel electrode structure and a liquid crystal display panel to alleviate technical problem of dark streaks in conventional liquid crystal display panels.

To solve the above problems, technical solutions provided in the present application are as follows.

An embodiment of the present application provides a pixel electrode structure, which includes at least one trunk electrode, a control electrode, and a connection electrode. The trunk electrode divides the pixel electrode structure into a first pixel electrode region and a second pixel electrode region. The control electrode is disposed at a position close to the first pixel electrode region and away from the second pixel electrode region, and a gap is defined between the control electrode and the first pixel electrode region. The connection electrode is disposed between the control electrode and the second pixel electrode region, an end of the connection electrode connected to the control electrode, and another end of the connection electrode is connected to the pixel electrode structure in the second pixel electrode region. The first pixel electrode region and the second pixel electrode region of the pixel electrode structure are symmetrical with respect to the at least one trunk electrode.

In the pixel electrode structure provided by an embodiment of the present application, the first pixel electrode region includes at least one first branch electrode, the second pixel electrode region includes at least one second branch electrode, and the at least one first branch electrode and the at least one second branch electrode are symmetrical with respect to the at least one trunk electrode.

In the pixel electrode structure provided by an embodiment of the present application, the at least one first branch electrode extends along the at least one trunk electrode in a first direction, and the at least one second branch electrode extends along the at least one trunk electrode in a second direction.

In the pixel electrode structure provided by an embodiment of the present application, a number of the at least one second branch electrode is at least two, a distance between each of the at least two second branch electrodes and the control electrode is different, and the another end of the connection electrode is connected to the at least two second branch electrodes away from the control electrode.

In the pixel electrode structure provided by an embodiment of the present application, a number of the at least one second branch electrode is at least two, a distance between each of the two second branch electrodes and the control electrode is different, and the another end of the connection electrode is connected to the at least two second branch electrodes close to the control electrode.

In the pixel electrode structure provided by an embodiment of the present application, the connection electrode includes at least a first connection portion and a second connection portion, the first connection portion connects the control electrode and the second connection portion, and the second connection portion connects the first connection portion and the at least two second branch electrodes.

In the pixel electrode structure provided by an embodiment of the present application, the first connection portion is perpendicular to the at least one trunk electrode, and the second connection portion is parallel to the second direction.

In the pixel electrode structure provided by an embodiment of the present application, a surface shape of the connection electrode includes a linear pattern.

In the pixel electrode structure provided by an embodiment of the present application, a surface shape of the connection electrode includes a polyline pattern.

In the pixel electrode structure provided by an embodiment of the present application, a surface shape of the connection electrode includes a curved pattern.

In the pixel electrode structure provided by an embodiment of the present application, a material of the pixel electrode structure includes indium tin oxide.

An embodiment of the present application further provides a liquid crystal display panel, which includes a first substrate, a second substrate, and a plurality of liquid crystal molecules. The first substrate includes a pixel electrode structure. The second substrate is disposed opposite to the first substrate and including a common electrode facing the first substrate. The liquid crystal molecules are filled between the first substrate and the second substrate. The pixel electrode structure includes at least one trunk electrode, a control electrode, and a connection electrode. The trunk electrode divides the pixel electrode structure into a first pixel electrode region and a second pixel electrode region. The control electrode is disposed at a position close to the first pixel electrode region and away from the second pixel electrode region, and a gap is defined between the control electrode and the first pixel electrode region. The connection electrode is disposed between the control electrode and the second pixel electrode region, an end of the connection electrode connected to the control electrode, and another end of the connection electrode is connected to the pixel electrode structure in the second pixel electrode region. The first pixel electrode region and the second pixel electrode region of the pixel electrode structure are symmetrical with respect to the at least one trunk electrode.

In the liquid crystal display panel provided by an embodiment of the present application, the first pixel electrode region includes at least one first branch electrode, the second pixel electrode region includes at least one second branch electrode, and the at least one first branch electrode and the at least one second branch electrode are symmetrical with respect to the at least one trunk electrode.

In the liquid crystal display panel provided by an embodiment of the present application, the at least one first branch electrode extends along the at least one trunk electrode in a first direction, and the at least one second branch electrode extends along the at least one trunk electrode in a second direction.

In the liquid crystal display panel provided by an embodiment of the present application, a number of the at least one second branch electrode is at least two, a distance between each of the at least two second branch electrodes and the control electrode is different, and the another end of the connection electrode is connected to the at least two second branch electrodes away from the control electrode.

In the liquid crystal display panel provided by an embodiment of the present application, a number of the at least one second branch electrode is at least two, a distance between each of the at least two second branch electrodes and the control electrode is different, and the another end of the connection electrode is connected to the at least two second branch electrodes close to the control electrode.

In the liquid crystal display panel provided by an embodiment of the present application, the connection electrode includes at least a first connection portion and a second connection portion, the first connection portion connects the control electrode and the second connection portion, and the second connection portion connects the first connection portion and the at least two second branch electrodes.

In the liquid crystal display panel provided by an embodiment of the present application, the first connection portion is perpendicular to the at least one trunk electrode, and the second connection portion is parallel to the second direction.

In the liquid crystal display panel provided by an embodiment of the present application, a surface shape of the connection electrode includes at least one of a linear pattern, a polyline pattern, or a curved pattern.

In the liquid crystal display panel provided by an embodiment of the present application, the first substrate is an array substrate, and the second substrate is a color filter substrate.

The beneficial effect of the present application is as follows. In a pixel electrode structure and a liquid crystal display panel provided by the present application, the control electrode is disposed at a position close to the first pixel electrode region and away from the second pixel electrode region, the connection electrode connects the control electrode and the second branch electrode in the second pixel electrode region, and increases a transmission distance from the control electrode to the pixel electrode in the display region. As the distance increases, a voltage drop interval becomes larger, and a voltage difference on the pixel electrode is reduced while entering the display region. An effect of the voltage difference on a liquid crystal alignment is reduced, preventing appearance of the dark streaks, improving quality of the display panel, and increasing contrast and transmittance of the liquid crystal display panel.

BRIEF DESCRIPTION OF THE SEVERAL VIEWS OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present invention, and based on these drawings, a person skilled in the art may obtain the other drawings without any creative effort.

DESCRIPTION OF SPECIFIC EMBODIMENTS OF THE INVENTION

Figure 1:
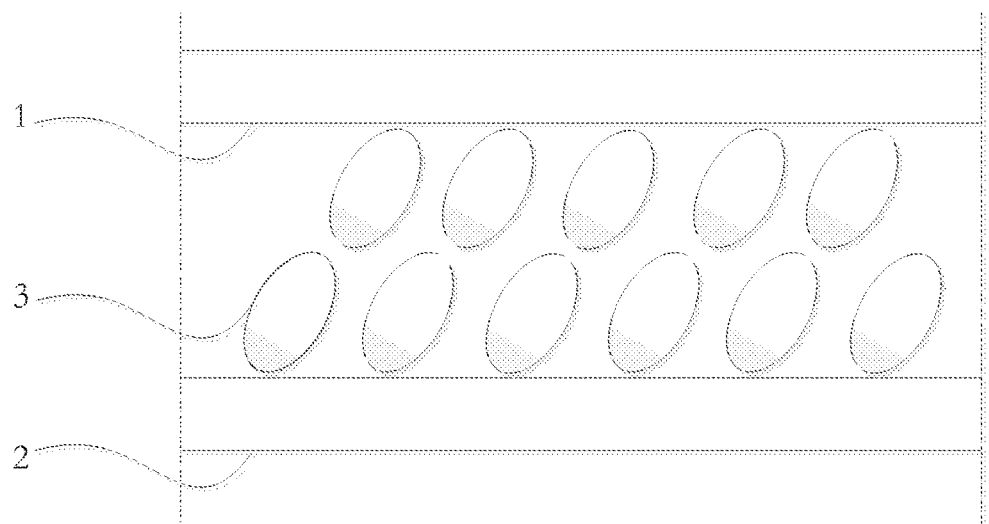
FIG. 1 is a schematic side view structural diagram of a pretilt angle formed after liquid crystal alignment in conventional art.
Figure 2:
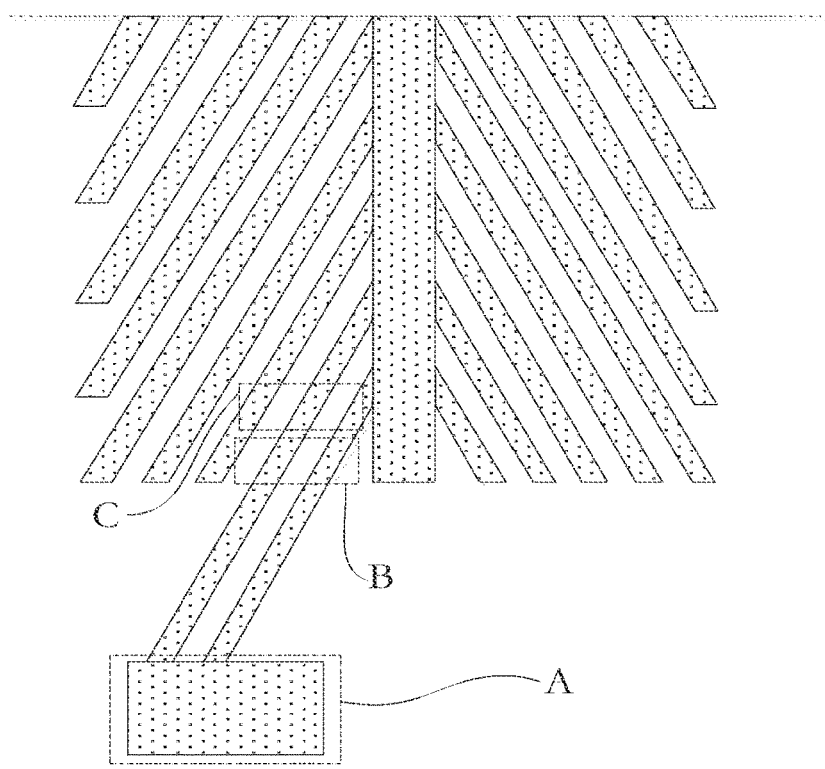
FIG. 2 is a schematic bottom view of a pixel electrode structure in conventional art.
Figure 3:
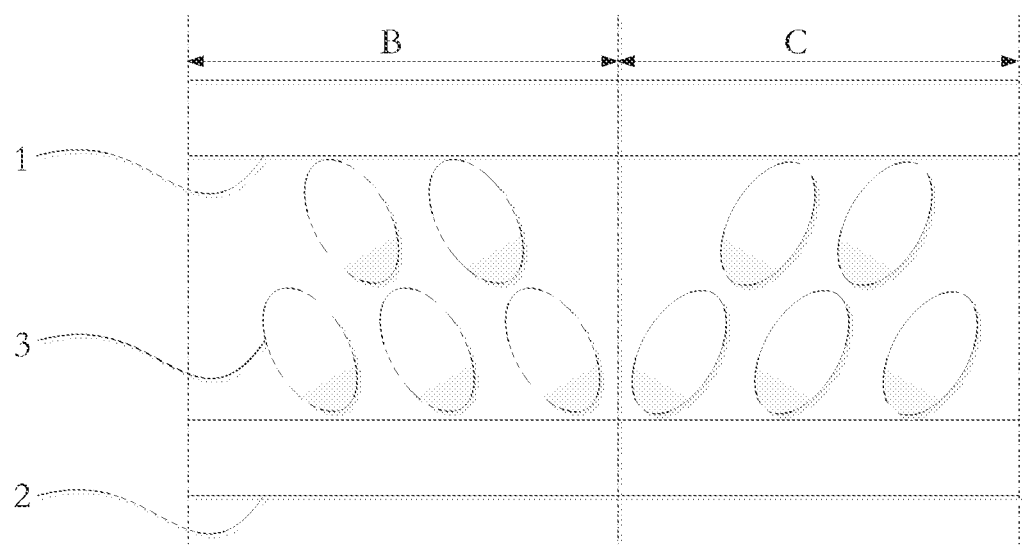
FIG. 3 is a schematic side view of liquid crystal molecules forming different orientations in conventional art.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present application. In the drawings, components having similar structures are denoted by the same numerals.

Figure 4:
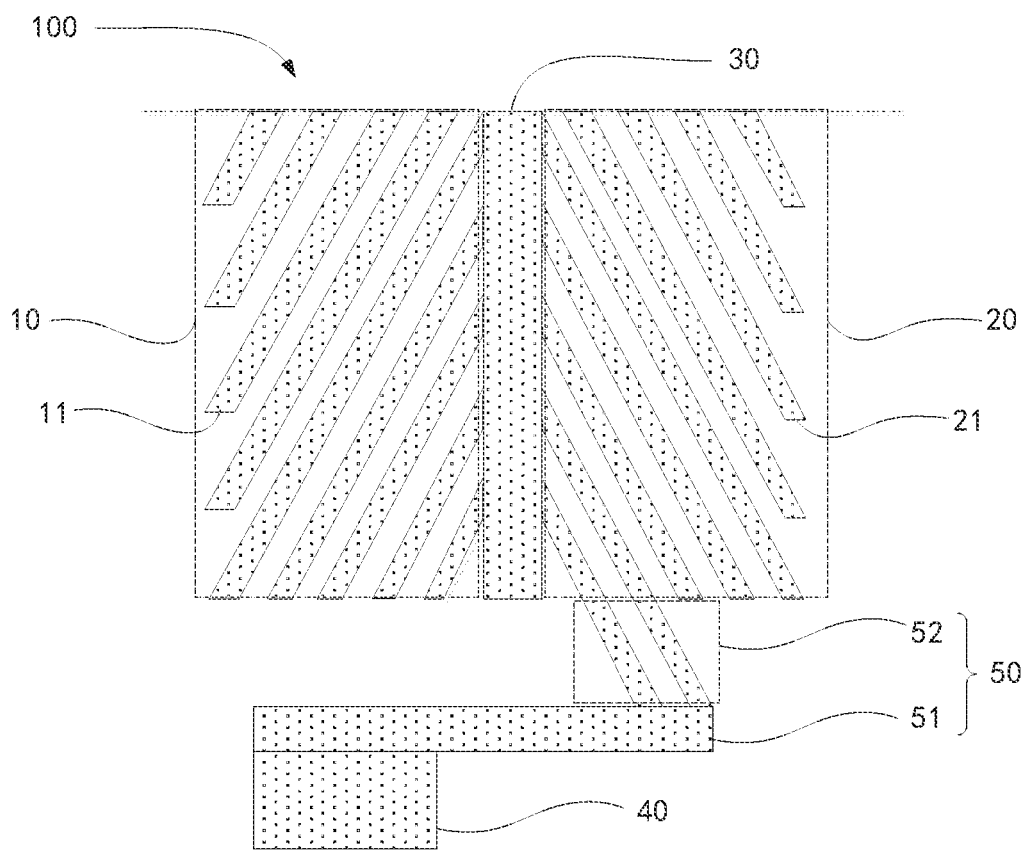
FIG. 4 is a schematic bottom view of a first structure of a pixel electrode structure according to an embodiment of the present application.

In an embodiment, as shown in FIG. 4, a pixel electrode structure 100 is provided, which includes at least one trunk electrode 30, a control electrode 40, and a connection electrode 50. The trunk electrode 30 divides the pixel electrode structure into a first pixel electrode region 10 and a second pixel electrode region 20. The control electrode 40 is disposed at a position close to the first pixel electrode region 10 and away from the second pixel electrode region 20, and a gap is defined between the control electrode 40 and the first pixel electrode region 10. The connection electrode 50 is disposed between the control electrode 40 and the second pixel electrode region 20. An end of the connection electrode 50 is connected to the control electrode 40 and the other end is connected to the pixel electrode structure in the second pixel electrode region 20 (as second branch electrodes 21 in FIG. 4). The first pixel electrode region 10 and the second pixel electrode region 20 of the pixel electrode structure are symmetrical with respect to the trunk electrode 30.

Specifically, the first pixel electrode region 10 includes at least one first branch electrode 11, and the second pixel electrode region 20 includes at least one second branch electrode 21, wherein the first branch electrode 11 and the second branch electrode 21 are symmetrical with respect to the trunk electrode 30.

Furthermore, as shown in FIG. 4, the first pixel electrode region 10 includes a plurality of first branch electrodes 11, and the second pixel electrode region 20 includes a plurality of second branch electrodes 21. The plurality of the first branch electrodes 11 are parallel to each other, and there is a gap between every two adjacent first branch electrodes 11. The plurality of the second branch electrodes 21 are parallel to each other, and there is a gap between every two adjacent second branch electrodes 21.

Furthermore, the first branch electrode 11 extends along the trunk electrode 30 in a first direction, and the second branch electrode 21 extends along the trunk electrode 30 in a second direction.

Specifically, a material of the pixel electrode structure is a transparent electrode material such as indium tin oxide.

It should be noted that the control electrode 40 in the present application refers to a voltage input terminal of the pixel electrode structure 100, that is, after the liquid crystal display panel is assembled, a voltage is input to the pixel electrode structure in order to form a pretilt angle for a liquid crystal alignment, which is a position arranged at a non-display pixel electrode region. The first pixel electrode region 10 and the second pixel electrode region 20 are arranged at a display pixel electrode region.

In the present embodiment, the connection electrode 50 connects the control electrode 40 and the pixel electrode structure in the second pixel electrode region 20, increases a transmission distance from the control electrode 40 to a pixel electrode in a display region, and increases a voltage drop interval to reduce effect of phase change of an electric field and prevents appearance of dark streaks.

In an embodiment, as shown in FIG. 4, the connection electrode 50 is disposed between the control electrode 40 and the second pixel electrode region 20, an end of the connection electrode 50 is connected to the control electrode 40, and the other end is connected to the second branch electrode 21 in the second pixel electrode region 20.

Specifically, a number of the second branch electrode is at least two, a distance between each of the at least two second branch electrodes and the control electrode is different, and the other end of the connection electrode 50 is connected to the at least two second branch electrodes 21 in the second pixel region 20 close to the control electrode 40.

Furthermore, as shown in FIG. 4, the second branch electrode is plural, and the other end of the connection electrode 50 is connected to the two second branch electrodes 21 close to the control electrode 40.

Specifically, the connection electrode 50 includes at least a first connection portion 51 and a second connection portion 52. The first connection portion 51 connects the control electrode 40 and the second connection portion 52. The second connection portion 52 connects the first connection portion 51 and the second branch electrode 21.

Furthermore, as shown in FIG. 4, the connection electrode 50 includes the first connection portion 51 and the second connection portion 52. One end of the first connection portion 51 is connected to the control electrode 40, the other end of the first connection portion 51 is connected to an end of the second connection portion 52, and the other end of the second connection portion 52 is connected to the second branch electrode 21. The second branch electrode 21 connected to the second connection portion 52 is close to the control electrode 40, and the second branch electrode 21 close to the control electrode 40 refers to the second branch electrode 21 having a relatively short distance from the control electrode 40.

Furthermore, the first connection portion 51 is perpendicular to the trunk electrode 30, and the second connection portion 52 is parallel to the second direction. Specifically, as shown in FIG. 4, the trunk electrode 30 is vertical, and the first connection portion 51 is horizontal. The second connection portion 52 is parallel to the second direction, that is, the second connection portion 52 connected to the second branch electrode 21 is on a straight line with the second branch electrode 21, and is parallel to the second branch electrode 21 that is not connected to the second connection portion 52.

Furthermore, a surface shape of the connection electrode 50 includes at least one or a combination of a linear pattern, a polyline pattern, a curved pattern, and the like.

Furthermore, as shown in FIG. 4, the surface shape of the connection electrode 50 is a polyline pattern, the first connection portion 51 of the connection electrode 50 forms a part of the polyline pattern, and the second connection portion 52 forms another part of the polyline pattern.

Furthermore, since the first connection portion 51 is perpendicular to the trunk electrode 30, an included angle between the second branch electrode 21 and the trunk electrode 30 (there are two angles between the branch electrode and the trunk electrode, an acute angle and an obtuse angle, where the included angle refers to the acute angle) and a folded angle of the polyline pattern are in sum of 90 degrees. The folded angle of the polyline pattern is an included angle between the first connection portion 51 and the second connection portion 52.

Furthermore, the connection electrode 50 is connected to the second branch electrode 21 in the second pixel electrode region 20 adjacent to the control electrode 40 in a polyline pattern, the transmission distance between the control electrode 40 and the pixel electrode in the display region is increased, and the voltage drop interval is increased.

Figure 5:
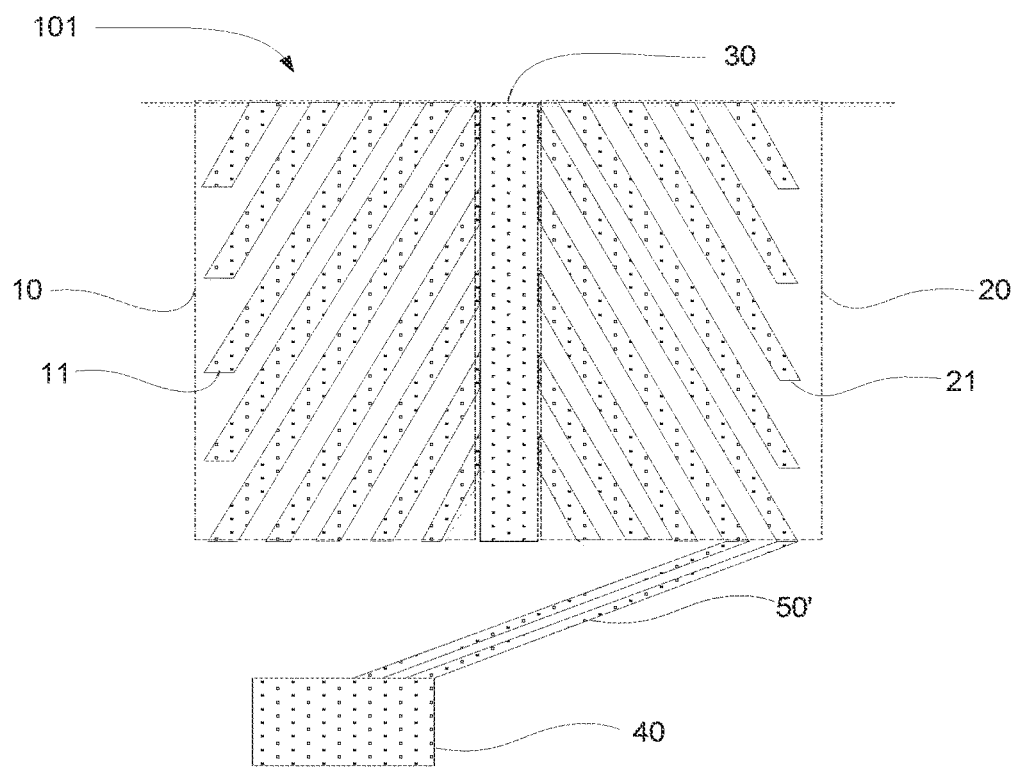
FIG. 5 is a schematic bottom view of a second structure of the pixel electrode structure according to an embodiment of the present application.

In an embodiment, in a pixel electrode structure 101 shown in FIG. 5, a trunk electrode 30 divides the pixel electrode structure 101 into a first pixel electrode region 10 and a second pixel electrode region 20. The first pixel electrode region 10 includes a plurality of first branch electrodes 11, and the second pixel electrode region 20 includes a plurality of second branch electrodes 21. A control electrode 40 is disposed close to the first pixel electrode region 10 and away from the second pixel electrode region 20. A connection electrode 50' connects the control electrode 40 and the second branch electrodes 21 in the first pixel electrode region 20.

Specifically, an end of the connection electrode 50' is connected to the control electrode 40, and the other end of the connection electrode 50' is connected to the second branch electrodes 21 in the second pixel electrode region 20 away from the control electrode 40.

It should be noted that the second branch electrodes 21 away from the control electrode 40 in the present embodiment and the second branch electrodes 21 close to the control electrode 40 in above embodiments are compared with a relative distance from the control electrode 40, and it will not be repeated here.

Furthermore, a surface shape of the connection electrode 50' includes at least one or a combination of a linear pattern, a polyline pattern, a curved pattern, and the like.

Furthermore, the surface shape of the connection electrode 50' is a linear pattern as shown in FIG. 5.

Figure 6:
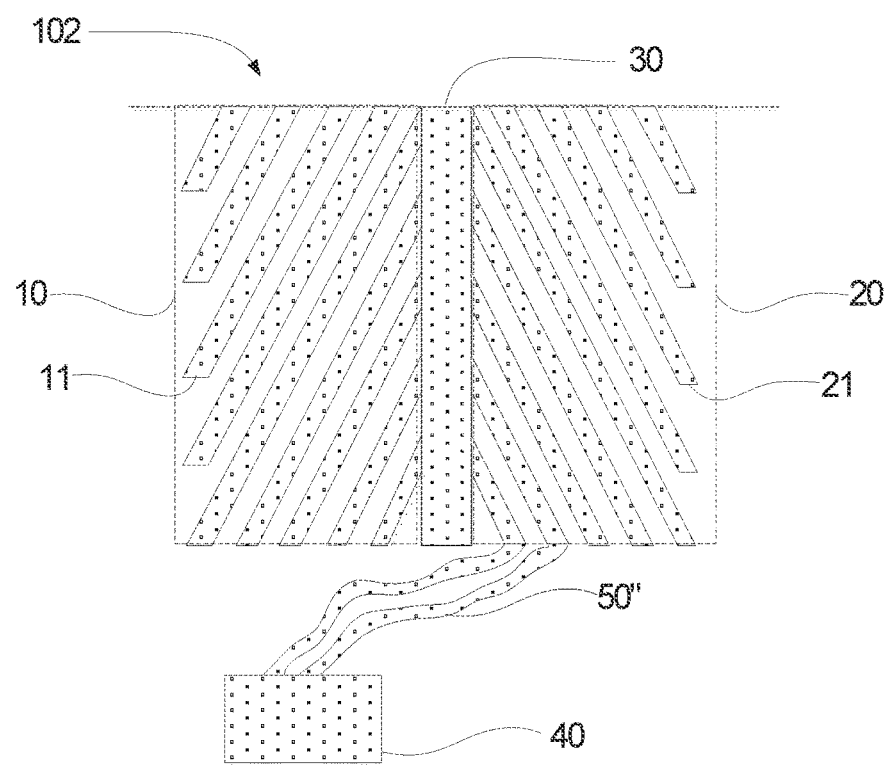
FIG. 6 is a schematic bottom view of a third structure of the pixel electrode structure according to an embodiment of the present application.

In an embodiment, a difference from above embodiments is that a surface shape of a connection electrode 50" is a curved pattern, as a pixel electrode structure 102 shown in FIG. 6, which an end of the connection electrode 50" is connected to a control electrode 40, the other end of the connection electrode 50" is connected to second branch electrodes 21 close to the control electrode 40 in a second pixel electrode region 20. For other descriptions, please refer to above embodiments, and will not be repeated here.

It should be noted that the surface shape of the connection electrode in the present application is not limited to the linear pattern, polyline pattern, and curve pattern listed in the present application, and the connection electrode can also be consisted of several surface shape patterns, for example, consisted of a linear pattern and a curve pattern.

Figure 7:
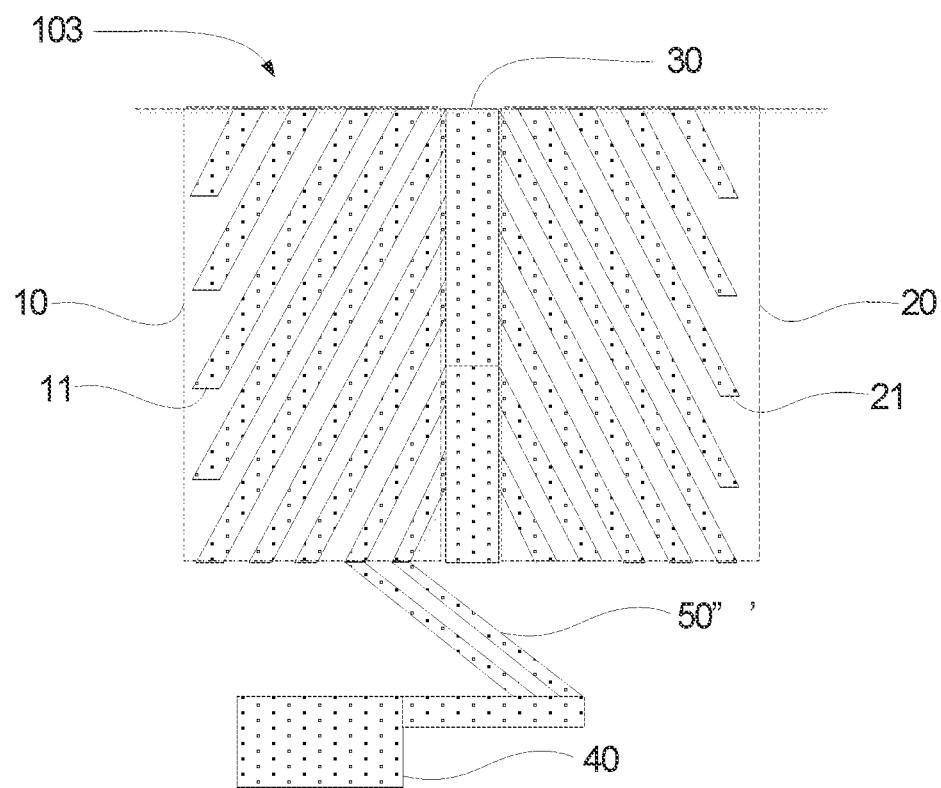
FIG. 7 is a schematic bottom view of a fourth structure of the pixel electrode structure according to an embodiment of the present application.

In another embodiment, a difference from above embodiments is that a connection electrode 50''' can also be connected to a control electrode 40 and first branch electrodes 11 of a first pixel electrode region 10, as shown in FIG. 7. An end of the connection electrode 50''' is connected to the control electrode 40, and the other end of the connection electrode 50''' is connected to the first branch electrodes 11 in the first pixel electrode region 10.

Specifically, a surface shape of the connection electrode 50''' is a polyline pattern, and the connection electrode 50''' of such polyline pattern can be connected to a first branch electrode 11 in the first pixel electrode region 10 close to the control electrode 40, and also possibly further connected to a first branch electrode 11 away from the control electrode 40. It is only necessary to adjust a length of the connection electrode according to required voltage drop. As shown in FIG. 7, the connection electrode 50''' is connected to the first branch electrodes 11 in the first pixel electrode region 10 close to the control electrode 40.

It should be noted that, close to the control electrode 40 or away from the control electrode 40 in the present embodiment refers to a relative distance between a position where the first branch electrode 11 is connected to the trunk electrode 30, and the control electrode 40.

In an another embodiment, the control electrode is disposed at a position close to the second pixel electrode region and away from the first pixel electrode region, and an arrangement of the connection electrode as above embodiments is adopted to increase the transmission distance from the connection electrode to the pixel electrode in the display region, which can also prevent dark streaks and is not repeated here.

Figure 8:
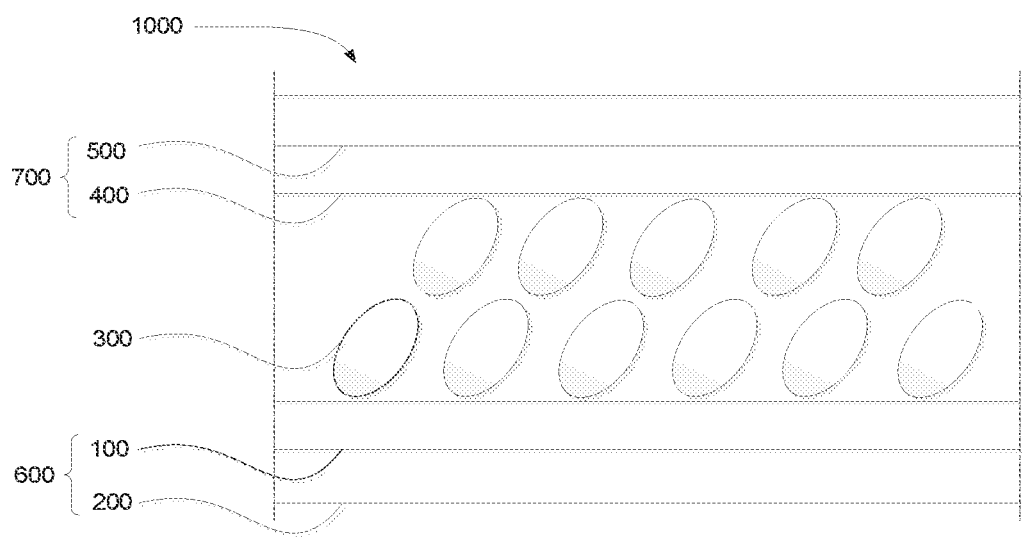
FIG. 8 is a schematic side structural view of a liquid crystal display panel according to an embodiment of the present application.

In an embodiment, a liquid crystal display panel 1000 is provided as shown in FIG. 8. It includes a first substrate 600, a second substrate 700, and a plurality of liquid crystal molecules 300. The first substrate 600 includes a pixel electrode structure provided by one of the foregoing embodiments of the present application. The second substrate 700 is disposed opposite to the first substrate 600 and includes a common electrode 400 facing the first substrate 600. The plurality of liquid crystal molecules 300 are filled between the first substrate 600 and the second substrate 700.

Specifically, the first substrate 600 is an array substrate, and the second substrate 700 is a color filter substrate. The pixel electrode structure on the first substrate 600 is described by taking the pixel electrode structure 100 of FIG. 4 in above embodiment as an example.

Furthermore, the first substrate 600 further includes a first base 200, and the pixel electrode structure 100 is disposed on the first base 200. The second substrate 700 further includes a second base 500, and the common electrode 400 is disposed under the second base 500.

Figure 9:
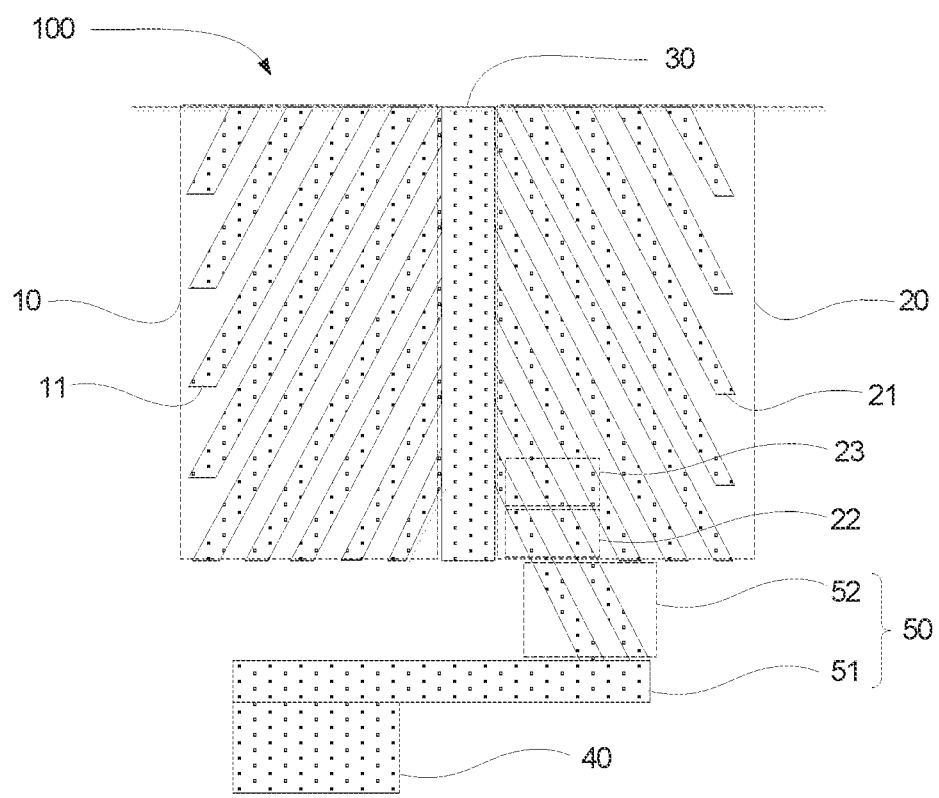
FIG. 9 is a partially detailed schematic diagram of the first structure of the pixel electrode structure according to an embodiment of the present application.

Specifically, in the pixel electrode structure 100 as shown in FIG. 9, the second branch electrode 21 connected to the connection electrode 50 is divided into two regions, the region closer to the connection electrode 50 is a first region 22, and the region adjacent to the first region 22 and away from the connection electrode 50 is a second region 23.

Furthermore, the connection electrode 50 connects the control electrode 40 and the second branch electrode 21 in the second pixel electrode region 20 to increase the transmission distance from the control electrode 40 to the pixel electrode in the display region. As the voltage increases, the voltage drop interval becomes larger, which reduces the voltage difference on the pixel electrode when entering the display region, that is, the voltage difference between the first region 22 and the second region 23 decreased, so that a difference in an electric field strength of the first region 22 and the second region 23 is reduced. Therefore, a liquid crystal orientation of the first region 22 and a liquid crystal orientation of the second region 23 are consistent, and an arrangement state of the liquid crystal molecules as shown in FIG. 8 is formed, preventing occurrence of dark streaks at a boundary between the first region and the second region due to an effect of the voltage difference on the liquid crystal alignment.

It should be noted that the pixel electrode structure illustrated in the present application is only shown in part, and the pixel electrode structure of the present application is not limited to two pixel electrode regions divided by a trunk electrode. The pixel electrode structure of the present application can be a four-domain display or other structures such as eight-domain display.

According to above embodiments, it can be known that:

the present application provides a pixel electrode structure and a liquid crystal display panel, wherein the pixel electrode structure includes at least a trunk electrode, a control electrode, and a connection electrode. The trunk electrode divides the pixel electrode structure into a first pixel electrode region and a second pixel electrode region. The control electrode is disposed at a position close to the first pixel electrode region and away from the second pixel electrode region, and a gap is defined between the control electrode and the first pixel electrode region. The connection electrode is disposed between the control electrode and the second pixel electrode region, an end of the connection electrode is connected to the control electrode, and the other end is connected to a second branch electrode of the second pixel electrode region. A transmission distance between the control electrode and the pixel electrode in the display region is increased. As the distance increases, a voltage drop interval becomes larger, and a voltage difference on the pixel electrode is reduced while entering the display region. An effect of the voltage difference on a liquid crystal alignment is reduced, preventing appearance of the dark streaks, improving quality of the display panel, and increasing contrast and transmittance of the liquid crystal display panel.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A pixel electrode structure, comprising:
   at least one trunk electrode dividing the pixel electrode structure into a first pixel electrode region and a second pixel electrode region;
   a control electrode disposed at a position close to the first pixel electrode region and away from the second pixel electrode region, wherein a gap is defined between the control electrode and the first pixel electrode region; and
   a connection electrode disposed between the control electrode and the second pixel electrode region, wherein an end of the connection electrode is connected to the control electrode, and another end of the connection electrode is connected to the pixel electrode structure in the second pixel electrode region;
   wherein the first pixel electrode region and the second pixel electrode region of the pixel electrode structure are symmetrical with respect to the at least one trunk electrode;
   wherein a surface shape of the connection electrode comprises a curved pattern along a curved line, and a length of the curved line is greater than a length of a straight line connected between the ends of the connection electrode.

2. The pixel electrode structure according to claim 1, wherein the first pixel electrode region comprises at least one first branch electrode, the second pixel electrode region comprises at least one second branch electrode, and the at least one first branch electrode and the at least one second branch electrode are symmetrical with respect to the at least one trunk electrode.

3. The pixel electrode structure according to claim 2, wherein the at least one first branch electrode extends along the at least one trunk electrode in a first direction, and the at least one second branch electrode extends along the at least one trunk electrode in a second direction.

4. The pixel electrode structure according to claim 3, wherein a number of the at least one second branch electrode is at least two, a distance between each of the at least two second branch electrodes and the control electrode is different, and the another end of the connection electrode is connected to the at least two second branch electrodes away from the control electrode.

5. The pixel electrode structure according to claim 3, wherein a number of the at least one second branch electrode is at least two, a distance between each of the two second branch electrodes and the control electrode is different, and the another end of the connection electrode is connected to the at least two second branch electrodes close to the control electrode.

6. The pixel electrode structure according to claim 5, wherein the connection electrode comprises at least a first connection portion and a second connection portion, the first connection portion connects the control electrode and the second connection portion, and the second connection portion connects the first connection portion and the at least two second branch electrodes.

7. The pixel electrode structure according to claim 1, wherein a material of the pixel electrode structure comprises indium tin oxide.

8. A liquid crystal display panel, comprising:
   a first substrate comprising a pixel electrode structure;
   a second substrate disposed opposite to the first substrate and comprising a common electrode facing the first substrate; and
   a plurality of liquid crystal molecules filled between the first substrate and the second substrate;
   wherein the pixel electrode structure comprises:
   at least one trunk electrode dividing the pixel electrode structure into a first pixel electrode region and a second pixel electrode region;
   a control electrode disposed at a position close to the first pixel electrode region and away from the second pixel electrode region, wherein a gap is defined between the control electrode and the first pixel electrode region; and
   a connection electrode disposed between the control electrode and the second pixel electrode region, wherein an end of the connection electrode is connected to the control electrode, and another end of the connection electrode is connected to the pixel electrode structure in the second pixel electrode region;
   wherein the first pixel electrode region and the second pixel electrode region of the pixel electrode structure are symmetrical with respect to the at least one trunk electrode;
   wherein a surface shape of the connection electrode comprises a curved pattern along a curved line, and a length of the curved line is greater than a length of a straight line connected between the ends of the connection electrode.

9. The liquid crystal display panel according to claim 8, wherein the first pixel electrode region comprises at least one first branch electrode, the second pixel electrode region comprises at least one second branch electrode, and the at least one first branch electrode and the at least one second branch electrode are symmetrical with respect to the at least one trunk electrode.

10. The liquid crystal display panel according to claim 9, wherein the at least one first branch electrode extends along the at least one trunk electrode in a first direction, and the at least one second branch electrode extends along the at least one trunk electrode in a second direction.

11. The liquid crystal display panel according to claim 10, wherein a number of the at least one second branch electrode is at least two, a distance between each of the at least two second branch electrodes and the control electrode is different, and the another end of the connection electrode is connected to the at least two second branch electrodes away from the control electrode.

12. The liquid crystal display panel according to claim 10, wherein a number of the at least one second branch electrode is at least two, a distance between each of the at least two second branch electrodes and the control electrode is different, and the another end of the connection electrode is connected to the at least two second branch electrodes close to the control electrode.

13. The liquid crystal display panel according to claim 12, wherein the connection electrode comprises at least a first connection portion and a second connection portion, the first connection portion connects the control electrode and the second connection portion, and the second connection portion connects the first connection portion and the at least two second branch electrodes.

14. The liquid crystal display panel according to claim 8, wherein the first substrate is an array substrate, and the second substrate is a color filter substrate.

* * * * *